(12) United States Patent
Chun

(10) Patent No.: US 11,197,158 B2
(45) Date of Patent: Dec. 7, 2021

(54) VEHICLE AND METHOD FOR CONTROLLING THE SAME

(71) Applicants: Hyundai Motor Company, Seoul (KR); Kia Motors Corporation, Seoul (KR)

(72) Inventor: Chang Woo Chun, Anyang-si (KR)

(73) Assignees: HYUNDAI MOTOR COMPANY, Seoul (KR); Kia Motors Corporation, Seoul (KR)

(*) Notice: Subject to any disclaimer, the term of this patent is extended or adjusted under 35 U.S.C. 154(b) by 161 days.

(21) Appl. No.: 16/361,584

(22) Filed: Mar. 22, 2019

(65) Prior Publication Data

US 2020/0162914 A1 May 21, 2020

(30) Foreign Application Priority Data

Nov. 19, 2018 (KR) .................... 10-2018-0142348

(51) Int. Cl.
*H04W 12/062* (2021.01)
*B60N 2/00* (2006.01)
*H04W 4/48* (2018.01)
*H04W 12/06* (2021.01)
*H04W 4/40* (2018.01)

(52) U.S. Cl.
CPC .......... *H04W 12/062* (2021.01); *B60N 2/002* (2013.01); *H04W 4/40* (2018.02); *H04W 4/48* (2018.02); *H04W 12/06* (2013.01)

(58) Field of Classification Search
CPC ... H04W 12/0602; H04W 12/06; H04W 4/48; H04W 4/40; B60N 2/002
See application file for complete search history.

(56) References Cited

U.S. PATENT DOCUMENTS

| | | | |
|---|---|---|---|
| 9,902,266 B2 * | 2/2018 | Pisz | B60K 35/00 |
| 9,998,899 B1 * | 6/2018 | Tannenbaum | G08B 21/0272 |
| 10,384,647 B2 * | 8/2019 | Tayama | A61B 5/1172 |
| 2014/0298431 A1 * | 10/2014 | Kim | H04W 12/069 726/5 |
| 2014/0309806 A1 * | 10/2014 | Ricci | G06F 21/32 701/1 |
| 2018/0247037 A1 * | 8/2018 | Weller | G06F 21/40 |

* cited by examiner

*Primary Examiner* — Hunter B Lonsberry
*Assistant Examiner* — Jay Khandpur
(74) *Attorney, Agent, or Firm* — Morgan, Lewis & Bockius LLP

(57) ABSTRACT

A vehicle may include a plurality of seats including at least one front seat provided with a driver seat and at least one back seat located behind the front seat, an authentication module configured to perform authentication of a user, and a controller configured to provide a connected vehicle service according to whether authentication is completed by the authentication module, wherein the controller determines whether the user is accommodated on the back seat, and controls the authentication module to perform authentication of the connected vehicle service executable in the back seat on the basis of the determined result.

12 Claims, 12 Drawing Sheets

FIG. 4

| CONNECTED CAR SERVICE TYPES | CONTENTS | SECURITY LEVEL | AUTHENTICATION METHODS |
|---|---|---|---|
| ACCOUNT CREATION | SERVICE SUBSCRIPTION, VEHICLE REGISTRATION | HIGHEST | CONFIRM PERSONAL IDENTIFICATION INFORMATION |
| VEHICLE CONTROL | DRIVING, REMOTE CONTROL, FAULT DIAGNOSIS, AUTOMATIC NOTIFICATION OF ACCIDENTS, SOS | HIGH | CONFIRM PERSONAL ACCOUNT |
| FIRST PERSONALIZED SERVICE | SERVICES REQUIRING LOGIN TO PERSONAL ACCOUNT | MEDIUM | CONFIRM SERVICE USE |
| SECOND PERSONALIZED SERVICE | VEHICLE CONTENTS PERSONAL SERVICE | LOW | CONFIRM OCCUPIED STATE |
| REAL-TIME INFORMATION SERVICE | WEATHER, NEWS, TRAFFIC INFORMATION | LOW | CONFIRM OCCUPIED STATE |

FIG. 5

| CONNECTED CAR SERVICE TYPES | ARRANGEMENT OF SEATS |
|---|---|
| ACCOUNT CREATION | INDEPENDENT USE OF EACH SEAT |
| VEHICLE CONTROL | DRIVER SEAT |
| FIRST PERSONALIZED SERVICE | INDEPENDENT USE OF EACH SEAT |
| SECOND PERSONALIZED SERVICE | DRIVER SEAT |
| REAL-TIME INFORMATION SERVICE | INDEPENDENT USE OF EACH SEAT |

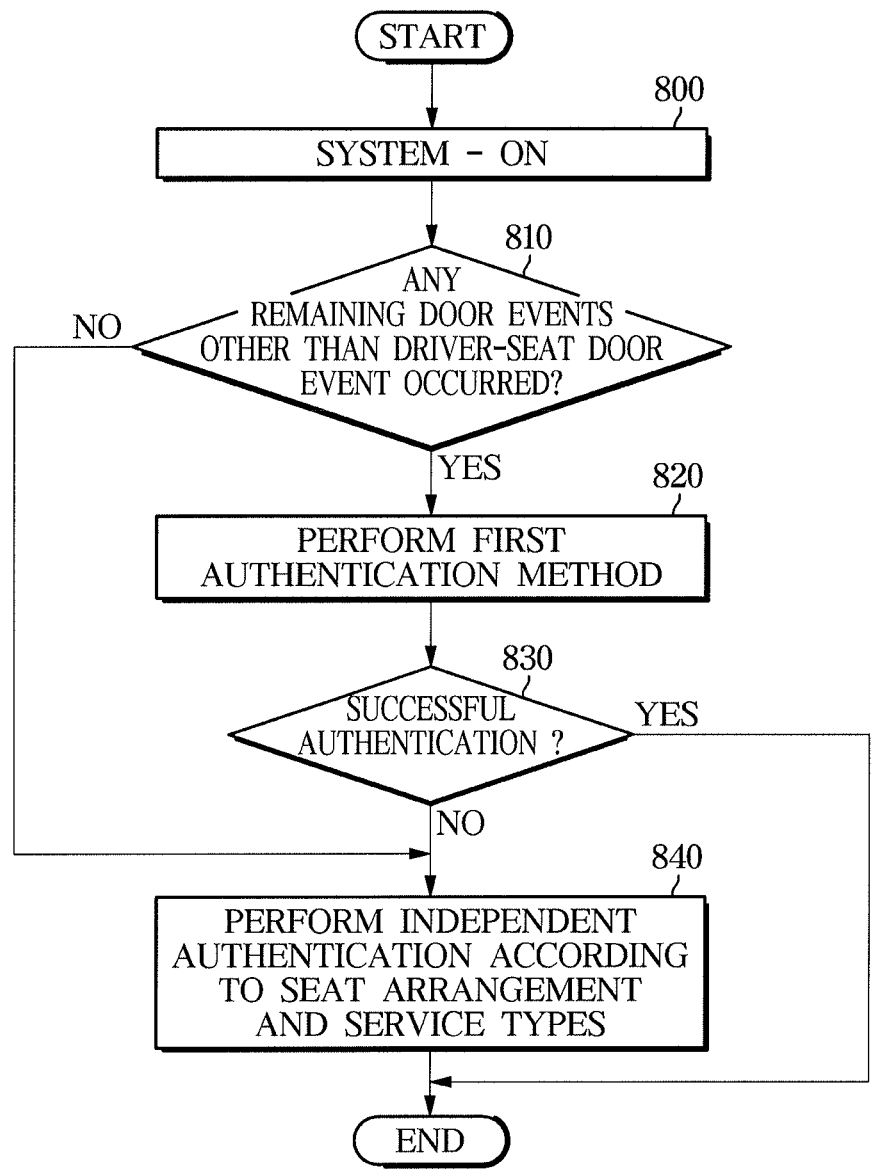

VEHICLE AND METHOD FOR CONTROLLING THE SAME

CROSS-REFERENCE TO RELATED APPLICATION

The present application claims priority to Korean Patent Application No. 10-2018-00142348, filed on Nov. 19, 2018 in the Korean Intellectual Property Office, the entire contents of which is incorporated herein for all purposes by this reference.

BACKGROUND OF THE INVENTION

Field of the Invention

The present invention relates to a vehicle for executing a connected-car service by discriminating vehicle seats from each other.

Description of Related Art

Connected vehicle technology has recently been developed and rapidly come into widespread use. A connected vehicle is a vehicle (or a car) with Internet access based on information communication technology, such that the connected vehicle can provide a user with two-way Internet and mobile services, etc.

Connected vehicle technology may be classified into embedded connected vehicle technology and mirroring connected vehicle technology. Embedded connected vehicle technology may refer to technology for connecting an in-vehicle modem to a mobile communication network through a user equipment (UE) such as a mobile phone. Mirroring connected vehicle technology may refer to technology for connecting a user equipment (UE) to an in-vehicle Audio Video Navigation (AVN) device through Wi-Fi communication.

A vehicle based on the embedded or mirroring connected vehicle technology may be combined with a user equipment (UE), such that the vehicle provides a user with a variety of infotainment. A variety of infotainment, which is capable of being supplied from the vehicle by interacting with the UE, will hereinafter be referred to as a connected vehicle service for convenience of description.

Meanwhile, Internet and mobile services available through one or more UEs are provided with security functions optimized for privacy protection and settlement services. However, the connected vehicle service coupled to a UE through the vehicle has disadvantages in that, after execution of only driver-based authentication, the connected vehicle service may be made available through simple security authentication, resulting in lack of security. Furthermore, although the conventional connected vehicle service is implemented to be separately coupled to each of seats of the vehicle, it is impossible for the vehicle provided with the connected vehicle service to independently authenticate passengers of the respective seats, resulting in security vulnerability.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle for adjusting an authentication level appropriate for the use environment of a vehicle infotainment system by supplying an authentication service per seat to passengers accommodated on different seats, maintaining a security level and increasing use convenience, and a method for controlling the same.

Additional aspects of the present invention will be set forth in part in the description which follows and, in part, will be obvious from the description, or may be learned by practice of the present invention.

In accordance with an aspect of the present invention, a vehicle may include a plurality of seats including at least one front seat provided with a driver seat and at least one back seat located behind the front seat, an authentication module configured to perform authentication of a user, and a controller configured to provide a connected vehicle service according to whether authentication is completed by the authentication module. The controller is configured to determine whether the user is accommodated on the back seat, and controls the authentication module to perform authentication of the connected vehicle service executable in the back seat on the basis of the determined result.

The controller may be configured to determine a security level based on at least one of occupation or non-occupation of the front seat, occupation or non-occupation of the back seat, or type information of the connected vehicle service.

The controller may be configured to determine whether a first authentication method based on the determined security level is conducted, and may perform a second authentication method having a security level lower than a security level of the first authentication method based on authentication completion of the first authentication method.

The controller may be configured to determine whether pre-authentication of the connected vehicle service is completed, and may perform the second authentication method based on completion of the pre-authentication.

The controller may be configured to determine whether the pre-authentication is completed and the user is accommodated on the back seat, and may perform the second authentication method or exceptional security authentication based on the determined result.

After authentication is completed in the back seat, the controller may release the authentication based on at least one of a door event, an engine OFF state of the vehicle, or a log-out event.

When the door event occurs in the back seat, the controller may release the authentication based on an authentication retention time.

When the authentication is released, the controller may delete the connected vehicle service and private personal data included in the authentication.

The controller may receive information related to completion or non-completion of pre-authentication from an external portion of the vehicle, and may determine an authenticator of the pre-authentication to be a driver when a door event of the driver seat occurs.

When a door event of the back seat occurs, the controller may perform authentication of the connected vehicle service executable in the back seat, may determine whether the pre-authentication information is identical to information related to the user, and may determine the pre-authenticated authenticator to be a passenger according to the determined result.

In accordance with another aspect of the present invention, a method for controlling a vehicle provided with a plurality of seats including at least one front seat provided with a driver seat and at least one back seat located behind the front seat, may include determining whether a user is accommodated on the back seat, performing authentication of a connected vehicle service executable in the back seat based on the determined result, and performing the connected vehicle service based on completion or non-completion of the authentication.

The method may further include determining a security level based on at least one of occupation or non-occupation of the front seat, occupation or non-occupation of the back seat, or type information related to the connected vehicle service.

Performing the authentication may include determining whether a first authentication method based on the determined security level is conducted, and performing a second authentication method having a security level lower than a security level of the first authentication method based on authentication completion of the first authentication method.

Performing the authentication may include determining whether pre-authentication of the connected vehicle service is completed, and performing the second authentication method based on completion of the pre-authentication.

The performing the authentication may include determining whether the pre-authentication is completed and the user is accommodated on the back seat, and performing the second authentication method or exceptional security authentication based on the determined result.

The method may further include, after authentication is completed in the back seat, releasing the authentication based on at least one of a door event, an engine OFF state of the vehicle, or a log-out event.

The releasing the authentication may include, when the door event occurs in the back seat, releasing the authentication based on an authentication retention time.

The method may further include, when the authentication is released, deleting the connected vehicle service and private personal data included in the authentication.

The method may further include receiving information related to completion or non-completion of pre-authentication from an external portion of the vehicle, and when a door event of the driver seat occurs, determining an authenticator of the pre-authentication to be a driver.

The determining may include, when a door event of the back seat occurs, performing authentication of the connected vehicle service executable in the back seat, determining whether the pre-authentication information is identical to information related to the user, and determining the pre-authenticated authenticator to be a passenger according to the determined result.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a table illustrating security levels stored in a storage according to an exemplary embodiment of the present invention.

FIG. 5 is a table illustrating exemplary connected vehicle services classified according to individual seats of the vehicle according to an exemplary embodiment of the present invention.

FIG. 12 is a flowchart illustrating an authentication method when a door event occurs after authentication of a driver seat is completed.

Figure 1:
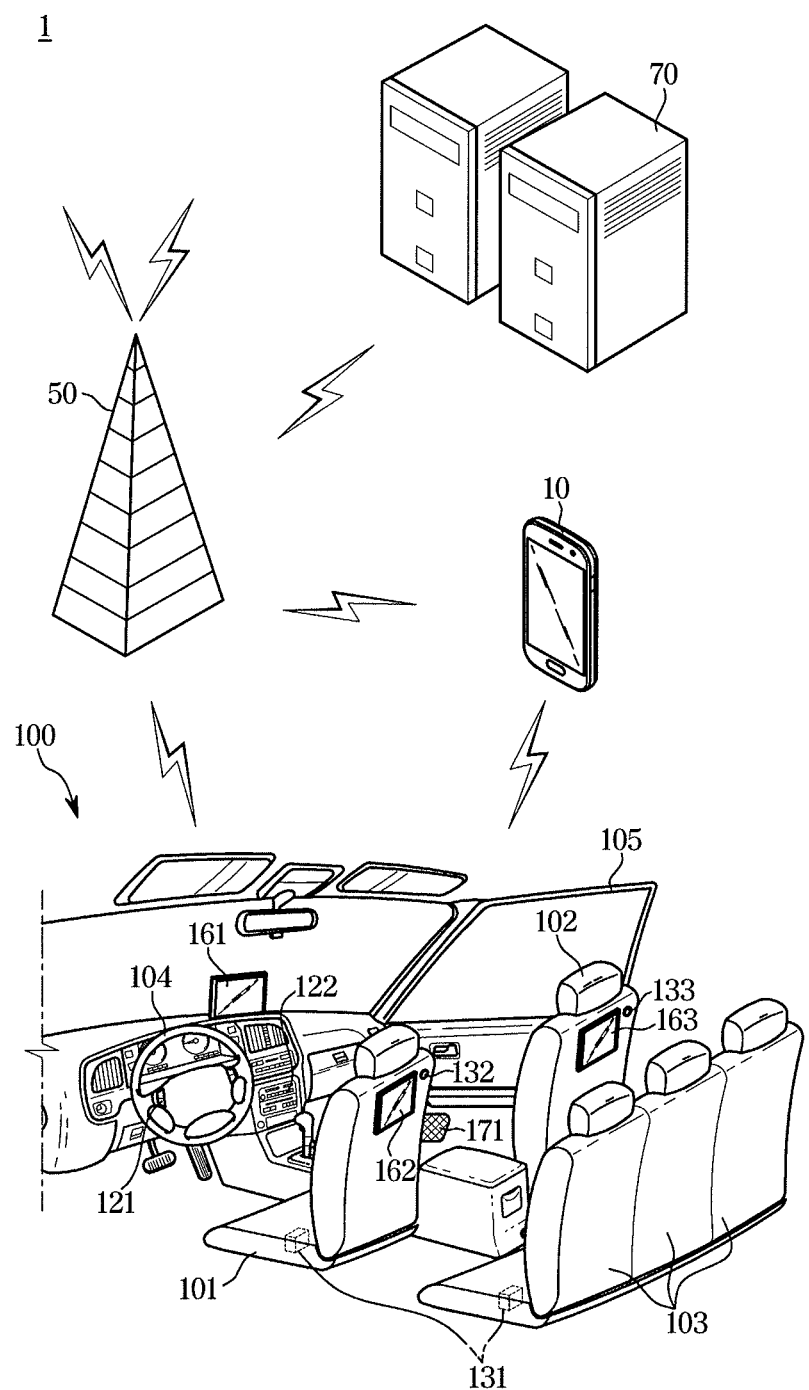
FIG. 1 is a conceptual diagram illustrating a connected vehicle service system according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Throughout the specification of the present invention, terms "part", "module", "member", "block", and the like mean an element capable of being implemented by hardware, software, or a combination thereof. As used in the specification and appended claims, the term "parts", "modules", "members", or "blocks" may be implemented by a single constituent element, or the term "part", "module", "member", or "block" may include a plurality of constituent elements.

Throughout the specification of the present invention, if it is assumed that a certain part is connected (or coupled) to another part, the term "connection or coupling" means that the certain part is directly connected (or coupled) to another part and/or is indirectly connected (or coupled) to another part. Here, indirect connection (or indirect coupling) may conceptually include connection (or coupling) over a wireless communication network.

Throughout the specification of the present invention, if it is assumed that a certain part includes a certain component, the term "comprising or including" means that a corresponding component may further include other components unless context clearly indicates otherwise.

In description of the present invention, the terms "first" and "second" may be used to describe various components, but the components are not limited by the terms. These terms may be used to distinguish one component from another component.

The terms "a", "an", "one", "the" and other similar terms include both singular and plural forms, unless context clearly dictates otherwise.

Identification numbers for use in respective operations to be described later are used for convenience of description and better understanding of the present invention, do not describe the order or sequence of the respective operations of the present invention, and the respective operations of the present invention may be conducted in a different way from the order written in an exemplary embodiment of the present invention, unless context of each operation clearly indicates a specific order.

The principles of the present invention and the exemplary embodiments of the present invention will hereinafter be provided with reference to the appended drawings. A vehicle and a method for controlling the same according to exemplary embodiments of the present invention will hereinafter be provided with reference to the appended drawings.

FIG. 1 is a conceptual diagram illustrating a connected vehicle service system 1 according to an exemplary embodiment of the present invention.

Referring to FIG. 1, the system 1 may include a vehicle 100, a user equipment (UE) 10 to communicate with the vehicle 100, a base station (BS) 50, and an authentication server 70 to decide whether at least one of the vehicle 100, the UE 10, or the BS 50 is authenticated.

The UE 10 may be implemented as a computer or mobile terminal configured for accessing the vehicle 100 over a network. For example, the computer may include a laptop provided with a web browser, a desktop computer, a tablet PC, a slate PC, etc. The mobile terminal may be implemented as a mobile communication device configured for being easily carried by a user. For example, the mobile terminal may include not only all kinds of handheld wireless communication devices, for example, a Personal Communication System (PCS), a Global System for Mobile communication (GSM), a Personal Digital Cellular (PDC) terminal, a Personal Handy-phone System (PHS), a Personal Digital Assistant (PDA), an IMT (International Mobile Telecommunication)-2000 terminal, a CDMA (Code Division Multiple Access)-2000 terminal, a W-CDMA (Wideband-Code Division Multiple Access) terminal, a WiBro (Wireless Broadband Internet) terminal, a smartphone, etc., but also all kinds of wearable devices, for example, a watch, a ring, a bracelet, an anklet, glasses, contact lenses, a head-mounted device (HMD), etc.

Although the following embodiment includes an exemplary case in which a user who carries a smartphone from among various kinds of UEs 10 gets in the vehicle 100 for convenience of description, the scope or spirit of the UEs 10 is not limited thereto.

The base station (BS) 50 may simultaneously communicate with the vehicle 100 and other devices through a large-scale antenna system. Furthermore, the large-scale antenna system may reduce noise by minimizing radio waves leaking in the remaining directions other than a desired transmission (Tx) direction thereof, such that signal transmission (Tx) quality is improved and power consumption is reduced.

The BS 50 may wirelessly communicate with the vehicle 100 traveling at a predetermined speed or higher. In more detail, the vehicle 100 may communicate with the BS 50 using any one of 2G communication, 3G communication, and 4G communication. For example, the 2G communication may include Time Division Multiple Access (TDMA), Code Division Multiple Access (CDMA), etc. The 3G communication may include Wideband Code Division Multiple Access (WCDMA), Code Division Multiple Access 2000 (CDMA2000), Wireless Broadband (WiBro), and World Interoperability for Microwave Access (WiMAX), etc. The 4G communication may include Long Term Evolution (LTE) and Wireless Broadband Evolution. Furthermore, the vehicle 5 may wirelessly communicate with the BS 50 using 5G communication. The 5G communication may transmit radio frequency (RF) signals modulated based on Non-Orthogonal Multiple Access (NOMA) to the BS 50 in a different way from conventional communication in which transmit (Tx) signals are modulated based on Orthogonal Frequency Division Multiplexing (OFDM).

The authentication server 70 may receive user authentication information from the vehicle 100, and may determine whether user authentication is completed. For example, when the authentication server 70 is a financial settlement server, the authentication server 70 may receive authentication completion information from the vehicle 1, and may transmit financial settlement data to the vehicle 100.

Although the authentication server 70 can receive authentication information from the vehicle 100 through the BS 50, it may be noted that the authentication server 70 can also perform user authentication through the UE 10. However, since the included embodiment relates to a connected vehicle service implemented by combination of the UE 10 and the vehicle 100, it is assumed that the following embodiments relate to technology for allowing the UE 10 to provide the connected vehicle service through the vehicle 100. That is, the vehicle 100 may provide a user with an authentication service through the UE 100 on behalf of the authentication server 70, and may adjust a security level and service type for user authentication based on not only the presence or absence of a user accommodated on each seat, but also a driving status of the vehicle 100, authenticating the user accommodated on the seat.

The vehicle 100 may include a plurality of displays 161, 162, and 163, a plurality of input devices 121 and 122, a plurality of sensor devices 131, 132, and 133, and a speaker 171. The display 161, 162, or 163 may display various interfaces that are supplied from the AVN device to a user. The input devices 121 and 122 may be disposed in the vicinity of the steering wheel 104 and seats 101, 102, and 103, and may receive a user command. The sensor devices 131, 132, and 133 may determine information (e.g., iris, fingerprint, etc., of the user) requisite for user authentication, and may determine whether the user is accommodated on the corresponding seat. The speaker 171 may provide the user with sound, warning sound, music, etc.

In more detail, the above-mentioned constituent elements may be hardware devices embedded in the vehicle 100, and may implement various operations needed to activate constituent elements to be described with reference to FIG. 2.

For example, the main display 161 mounted to a dashboard of the vehicle 100 may provide not only an authentication service for authenticating a driver accommodated on a driver seat 101 and a passenger accommodated on a passenger seat 102, but also an interface of a connected vehicle service. The main display 161 may convert an electric signal, that was transmitted from a controller 150 to a display module 160, into a visual signal, and may display the visual signal. Therefore, the main display 161 may provide an interface which is implemented to emit light through respective pixels.

In another example, the speaker 171 mounted to each door 105 of the vehicle 100 may output sound or voice signals for indicating authentication completion through vibration thereof.

The internal of the vehicle 100 may also include various services necessary for user authentication and connected vehicle services.

For convenience of description and better understanding of the present invention, the driver seat 101 and the passenger seat 102 will hereinafter be referred to as front seats, and rear seats located behind the front seats 101 and 102 will hereinafter be referred to as back seats.

Figure 2:
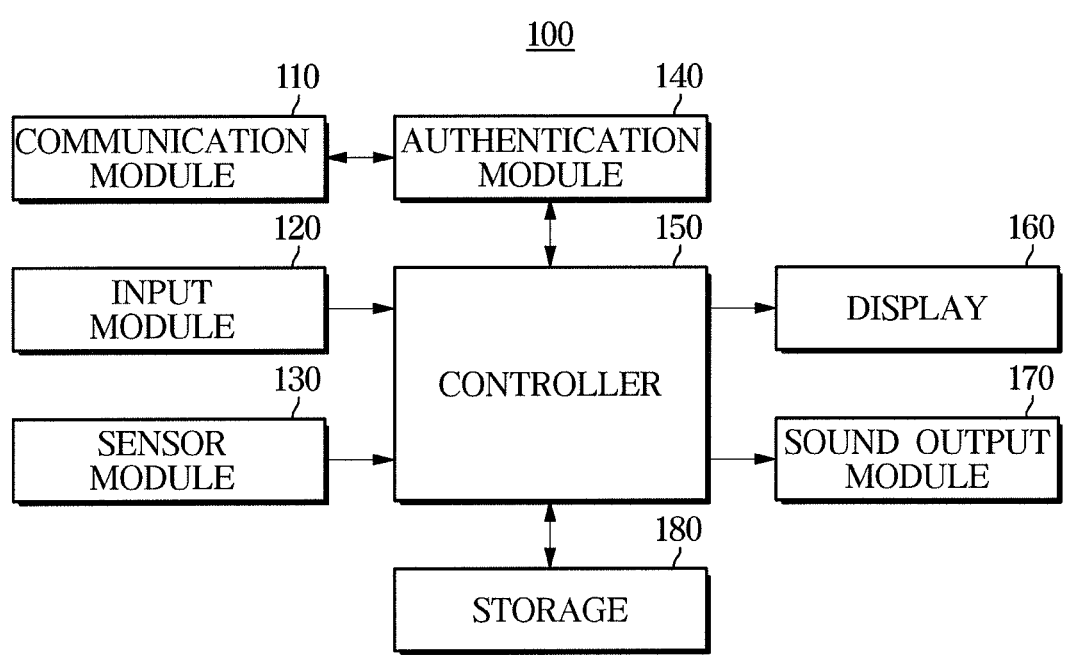
FIG. 2 is a block diagram illustrating a vehicle according to an exemplary embodiment of the present invention.

FIG. 2 is a block diagram illustrating the vehicle 100 according to an exemplary embodiment of the present invention.

Referring to FIG. 2, the vehicle 100 may include a communication module 110, an input module 120, a sensor module 130, an authentication module 140, a display module 160, a sound output module 170, a storage 180, and a controller 150. The communication module 110 may communicate with the UE 10 and an external portion of the vehicle 100. The input module 120 may receive an input command from a user. The sensor module 130 may detect whether the user is accommodated on any of seats. The authentication module 140 may perform an authentication service through an authentication server 70. The display module 160 may visually display various interfaces. The sound output module 170 may audibly output various interfaces. The storage 180 may store security levels and information related to authentication methods. The controller 150 may control the above-mentioned constituent elements.

In more detail, the communication module 110 may communicate with the UE 10, the BS 50, and the authentication server 70. In order for the authentication module 140 to perform an authentication service through the authentication server 70, the communication module 110 may transmit a password received from the user and data associated with the password to the authentication server 70. The communication module 110 may receive a signal indicating authentication completion from the authentication server 70, and may transmit the received authentication completion signal to the authentication module 140.

Furthermore, while driving of the vehicle 100, the communication module 110 may receive various signals, for example, signals necessary for communication between the vehicle 100 and a peripheral vehicle, Global Positioning System (GPS) signals received from a satellite, etc., and may retransmit the received signals to the outside of the vehicle 100.

Meanwhile, the communication module 110 may include constituent elements needed to perform the above-mentioned operations. For example, the communication module 110 may include at least one of a short-range communication module, a wired communication module, or a wireless communication module.

In more detail, the short range communication module may include a variety of short-range communication modules for transmitting/receiving signals over a wireless communication network over a short distance, for example, a Bluetooth module, an infrared (IR) communication module, a Radio Frequency Identification (RFID) communication module, a Wireless Local Area Network (WLAN) communication module, a Near Field Communication (NFC) communication module, a ZigBee communication module, etc.

The wired communication module may include not only various wired communication modules, for example, a Controller Area Network (CAN) communication module, a Local Area Network (LAN) module, a Wide Area Network (WAN) module, a Value Added Network (VAN) module, etc., but also various cable communication modules, for example, Universal Serial Bus (USB), High Definition Multimedia Interface (HDMI), Digital Visual Interface (DVI), RS-232 (recommended standard232), power line communication, a Plain Old Telephone Service (POTS), etc.

The wireless communication module may include various wired communication modules, for example, a Wi-Fi module, and a Wireless broadband (WiBro) module, and may further include a wireless communication module for supporting various wireless communication schemes, for example, Global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE), etc.

The wireless communication module may include a wireless communication interface comprised of an antenna and a transmitter that are needed to transmit RF signals. The wireless communication module may further include a radio frequency (RF) signal conversion module. Upon receiving a control signal from the controller, the RF signal conversion module may modulate a digital control signal received from the controller 150 through the wireless communication interface into an analog RF signal.

The wireless communication module may include a wireless communication interface comprised of an antenna and a receiver that are needed to receive RF signals. The wireless communication module may further include a radio frequency (RF) signal conversion module. The RF signal conversion module may demodulate an analog RF signal received through the wireless communication interface into a digital control signal.

The input module 120 may receive various input commands from the user.

For example, the input module 120 may receive a start command for Bluetooth pairing with the UE 10 from the user accommodated on the back seat 103. The input module 120 may receive a password necessary for such pairing from the user.

The input module 120 may receive various input commands needed to control the vehicle 100.

The input module 120 may include various buttons for user input or hardware (H/W) input devices, for example, a switch, a pedal, a keyboard, a mouse, a trackball, a lever, a handle, and a stick, without being limited thereto. The input module 120 is implemented as a graphical user interface (GUI) such as a touchpad for user input. That is, the input module 120 may include a software input device. The touchpad may be implemented as a touch screen panel (TSP), so that the touchpad and the display module 160 may form a mutual layer structure.

The sensor module 130 may be provided inside or outside the vehicle 100, and may receive and collect necessary information. For example, a weight sensor 131 provided in each seat may detect a weight of the user accommodated on the seat, and may thus generate an electric signal indicating the detected weight. Furthermore, a GPS sensor, a gyro sensor, an acceleration sensor may generate various signals necessary for vehicle driving.

The sensor module 130 may include a camera to capture external and internal images of the vehicle 100, and may convert the captured images into electric signals.

The sensor module 130 may include various sensors necessary for user authentication. In more detail, the sensor module 130 may be implemented as sensing devices 132 and 131 that are disposed in the vicinity of seats to recognize irises and fingerprints of the user. In another example, the sensor module 130 may also be implemented as a device configured for identifying a voice signal of the user.

The authentication module 140 may perform an authentication process needed to execute the connected vehicle service upon receiving user signals from the input module 120 and the sensor module 140. In more detail, the authentication module 140 may perform an authentication process using an authentication method necessary for a user-selected connected vehicle service. If the user finishes the authentication process, the authentication module 140 may provide the authentication server 70 with information indicating whether the authentication process was completed, through the communication module 110.

The authentication module 140 may perform various authentication processes according to various references, for example, information as to which seat was occupied by the user, security levels, and connected vehicle services.

For example, when the authentication module 140 is connected to the UE 50 and performs a connected vehicle service regarding E-mail search corresponding to a private service, the authentication module 140 may perform authentication with a high security level higher than that of a general service providing weather and news.

In another example, although the authentication module 140 performs a private service, which has the same security level as the aforementioned security level, in the driver seat 101, the authentication module 140 may also perform other authentication, a security level of which is adjusted based on the presence or absence of a passenger accommodated on the back seat 103.

In another example, although the same connected vehicle service as in previous processing is performed in the same seat as in the previous processing, the authentication module 140 may perform various authentication methods having different security levels according to whether pre-authentication of the user was conducted before the user gets in the vehicle 100.

In addition to the above-mentioned examples, the authentication module 140 may also perform independent authentication per seat. In other words, when several users get in the vehicle 100, the authentication module 140 may separately authenticate each user, such that the authentication module 140 may perform unique authentication that has different authentication methods based on the position of each seat and categories of the connected vehicle services to be performed.

Meanwhile, although the authentication module 140 is shown in FIG. 2 separately from the controller 150 for convenience of description, the scope or spirit of the present invention is not limited thereto, and the authentication module 140 may be incorporated with the controller 150 and perform an authentication method appropriate for a security level as necessary.

The display module 160 may be a display device to provide the user with visual information. The display module 160 may include various hardware devices, for example, a display such as an instrument panel to provide speed and various states of the vehicle 100, a Head Up Display (HUD) to display speed information on a windshield located forward of the driver seat 101, a main display 161 to display visual information received from the AVN device, and a back-seat display 162 to provide a user accommodated on the back seat 103 with the connected vehicle service.

The display module 160 may be implemented by any one of a Cathode Ray Tube (CRT), a Digital Light Processing (DLP) panel, a Plasma Display Panel (PDP), a Liquid Crystal Display (LCD) panel, an Electro Luminescence (EL) panel, an Electrophoretic Display (EPD) panel, an Electrochromic Display (ECD) panel, a Light Emitting Diode (LED) panel, and an Organic Light Emitting Diode (OLED) panel, without being limited thereto.

The sound output module 170 may output not only warning sound warning the user of a driving state of the vehicle 100, but also various sounds needed to provide the connected vehicle service. For example, the sound output module 170 may provide the user with a sound and guidance message indicating whether the authentication module 140 has completed authentication.

The sound output module 170 may be implemented as a plurality of speakers, such that an authentication method per seat and a connected vehicle service per seat may be supplied to the respective seats, such that the sound output module 170 may allow the respective services to be audibly output as different sound signals and different voice signals, may stop current audible output of different signals in a response to a control signal of the controller 150, and may output only one unified sound.

The controller 150 may be implemented as a memory to store an algorithm for controlling operations of the constituent elements of the vehicle 100 or data of a program related to the algorithm, or may be implemented as a processor for performing the above-mentioned operations using data stored in the memory. In the instant case, the memory and the processor may be implemented as different chips. Alternatively, the memory and the processor may also be implemented as a single chip as necessary.

The controller 150 may determine whether authentication is executed according to a connected vehicle service selected by the user, and may determine which seat will be used for the connected vehicle service, such that the controller 150 may select a proper authentication method necessary for the determined seat from among various authentication methods. Furthermore, the controller 150 may control the authentication module 140 to determine a proper security level according to various information, for example, a driving situation of the vehicle 100, the presence or absence of a passenger accommodated on the seat, information as to whether the user finishes pre-authentication, and categories of the connected vehicle services, and may allow the authentication module 140 to perform authentication necessary for the determined security level. A method for controlling the controller 150 will hereinafter be described with reference to the following drawings.

The storage 180 may store various kinds of information needed to operate the controller 150.

In more detail, the storage 180 may temporarily store various kinds of data received by the constituent elements, for example, the sensor module 130, the input module 120, etc., and may further store output data of the display module 160 and the sound output module 170. The storage 180 may store the relationship among connected vehicle service types, security levels, and authentication methods as shown in FIG. 4, and may provide data necessary for the controller 150 configured to decide a proper authentication method.

The storage 180 may temporarily or permanently store various kinds of data needed to drive the vehicle 100, and the type and size of data to be stored are not limited thereto.

Although the storage 180 may be implemented as any one of a non-volatile memory (e.g., a cache, a Read Only Memory (ROM), a Programmable ROM (PROM), an Erasable Programmable ROM (EPROM), an Electrically Erasable Programmable ROM (EEPROM), a flash memory, etc.), a volatile memory (e.g., a Random Access Memory (RAM)), and a storage medium (e.g., a Hard Disk Drive (HDD), a CD-ROM, etc.), the scope or spirit of the present invention is not limited thereto. In association with the controller 150, the storage 180 may be a memory which is implemented as a separate chip independent of the above-mentioned processor, or may be implemented as a processor and a single chip.

The vehicle 100 may further include various constituent elements in addition to the above-mentioned constituent elements. For example, the vehicle 100 may include all the constituent elements necessary for the connected vehicle service.

Figure 3:
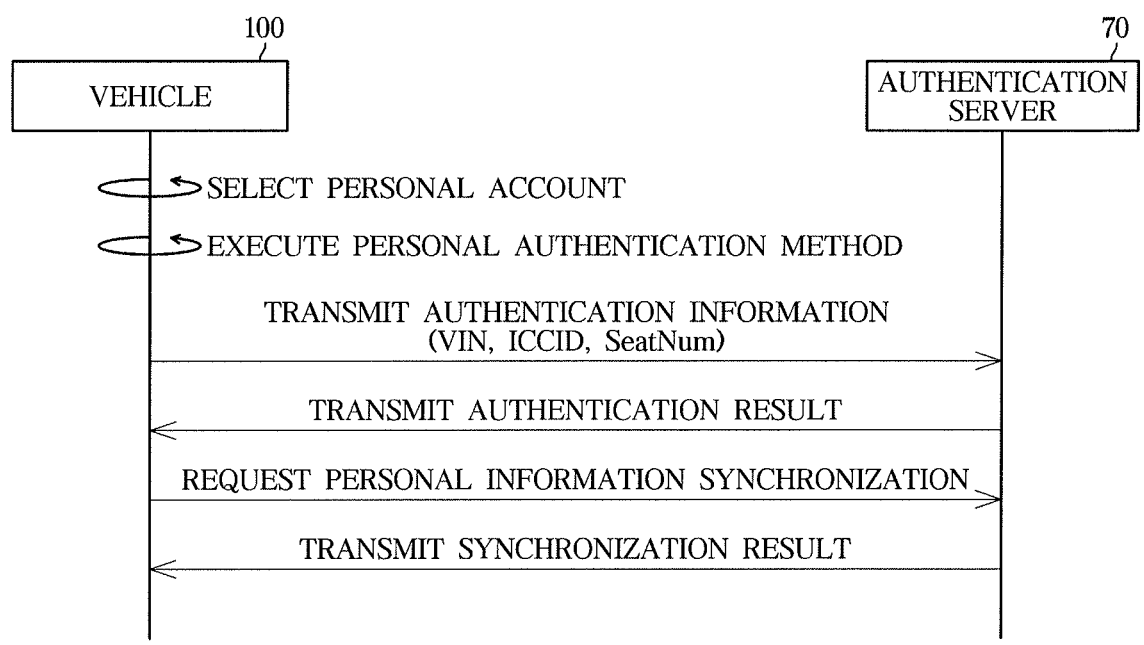
FIG. 3 is a flowchart illustrating a communication method between a vehicle and an authentication server according to an exemplary embodiment of the present invention.

FIG. 3 is a flowchart illustrating a communication method between the vehicle 100 and the authentication server 70 according to an exemplary embodiment of the present invention.

Referring to FIG. 3, the vehicle 100 may receive the connected vehicle service from the user accommodated on the seat.

The connected vehicle service may be conducted after user account and authentication have been conducted according to service types.

In more detail, the vehicle 100 may display an initial log-in screen image according to the selected connected vehicle service, and may receive an input signal associated with a personal account from the user. If necessary, the personal account may be input by or received from the user in advance, and may be stored in the vehicle 100. Alternatively, the user may input a new personal account as necessary.

If the personal account is selected, the vehicle 100 may execute the authentication method. The authentication method may be determined to have various security levels according to which seat is occupied by the user, the presence or absence of a passenger accommodated on any of seats, and the selected connected vehicle service. A detailed description of the authentication method will hereinafter be described with reference to the appended drawings.

After completion of such authentication, the vehicle 100 may transmit user-input authentication information to the authentication server 70.

As described above, the vehicle 100 may perform independent authentication per seat according to which seat is occupied by the user, such that the transmitted authentication information may include not only authentication information related to the connected vehicle service, but also seat number information (SeatNum) indicating the position of the seat occupied by the user.

In accordance with authentication information for the conventional connected vehicle service, only specific authentication information, for example, a Vehicle Identification Number (VIN) or an Integrated Circuit Card ID (ICCID), has been transmitted to the authentication server 70 according to service types. However, the vehicle 100 according to the exemplary embodiment of the present invention may transmit not only VIN and ICCID, but also seat number information (SeatNum), such that the authentication server 70 can distinguish an independent connected vehicle service per seat from other connected vehicle services based on the remaining seats.

The authentication server 70 may perform authentication using the received authentication information, and may retransmit the result of authentication to the vehicle 100. In the instant case, the vehicle 100 may determine that authentication has been completed.

After completion of such authentication, the vehicle 100 may transmit a personal information synchronization request to the authentication server 70, and the authentication server 70 may synchronize personalized information necessary for the connected vehicle service and transmit the result of synchronization to the vehicle 100. As a result, the vehicle 100 may perform authentication of the connected vehicle service per seat, and may provide a plurality of users with individual connected vehicle services, respectively.

FIG. 4 is a table illustrating security levels stored in the storage 180 according to an exemplary embodiment of the present invention.

The storage 180 may classify various connected vehicle services as represented by FIG. 4, and may identify security levels and authentication methods appropriate for the classified connected vehicle services.

For example, the connected vehicle service may be classified into an account creation service, a vehicle control service, a first personalized service, a second personalized service, and a real-time information service.

The account creation service is an authentication method for initial authentication needed to execute the connected vehicle service, for example, a telematics service subscription service, a vehicle registration service, etc. In more detail, for account creation, an authentication method in which individual identification information (for example, certificate, SMS authentication, etc.) may be confirmed may be conducted, such that the resultant account creation acquired by the above authentication method may be considered to have the highest security level.

The vehicle control service is an authentication method necessary for the connected vehicle service related to the vehicle 100. The vehicle control service may include a variety of connected vehicle services, for example, driving, remote control, fault diagnosis, automatic notification of accidents, and Save Our Ship (SOS) service, etc. The above-mentioned connected vehicle services related to such vehicle control may be directly associated with user security, such that it is more preferable that a high-level authentication method having a high security level as in the individual account confirmation be conducted. The high-level authentication method for individual account confirmation may include a variety of authentication methods, for example, password log-in authentication, e-mail authentication, biometric authentication such as iris or fingerprint authentication, security code authentication, One Time Password (OTP) authentication, etc.

The personalized service may refer to a connected vehicle service associated with a personal private life. For example, the personalized service may be classified into a first personalized service and a second personalized service. The first personalized service may include an e-mail login service, a settlement service, a valet mode, an Internet of Things (IoT) service, a location sharing service, and a personal account authority setting service. The second personalized service may include various services selectable by a user who rides in the vehicle 100, for example, a radio setting change service, a latest destination lookup service, a voice recognition service, a bookmark change service, etc.

The above-mentioned personalized services may be established to have a low security level less than that of the personal account creation and vehicle use authentication services. Due to unique characteristics of the respective services, the first personalized service may have an intermediate security level "Medium" which is higher than that of the second personalized service.

In the exemplary embodiment of the present invention, the security level "Medium" may include an authentication method needed to confirm the use of services. For example, the authentication method having the security level "Medium" may include Personal Identification Number (PIN) authentication, pattern authentication, face recognition, narrator (or speaker) recognition, Bluetooth pairing, etc.

The second personalized service may be established to have a security level "Low". For example, in the case of checking whether any of seats was occupied by a user who rides in the vehicle 100, if it is determined that the seat was occupied by the user, this means that the vehicle 100 was authenticated such that the vehicle 100 is in the authentication completion state. Furthermore, the authentication method having the security level "Low" may be completed only through simple location confirmation based on the UE 10.

The real-time information service for use in the connected vehicle service may include, for example, official announcements, weather, news, and traffic information, such that the real-time information service may be established to have a low security level as in the second personalized service.

The vehicle 100 may classify various connected vehicle services according to security levels thereof, and may store the respective security levels of the classified connected vehicle services. Prior to execution of the connected vehicle service activated by a user input command, the vehicle 100 may perform authentication appropriate for the user-input connected vehicle service classification. The vehicle 100 is configured to execute the user-input connected vehicle service after completion of such authentication.

Meanwhile, the above-mentioned connected vehicle service classification, security levels, and authentication methods are included only for illustrative purposes, and the scope or spirit of the present invention is not limited thereto.

FIG. 5 is a table illustrating exemplary connected vehicle services classified according to individual seats of the vehicle according to an exemplary embodiment of the present invention.

The vehicle 100 may perform independent connected vehicle service authentication per seat, and may control the use authority of the connected vehicle service to be independently allocated to each seat. That is, the connected vehicle service may be authenticated in different ways according to the respective seats, and the use authority of the connected vehicle service may be independently allocated to each seat, such that the connected vehicle service may be independently conducted in each seat. The above-mentioned distinction may be classified according to the connected vehicle service types, and may be pre-established in the storage 180.

Referring to FIG. 5, the account creation from among the connected vehicle service types may be associated with service subscription and vehicle registration. Therefore, account creation may be independently conducted in each seat.

The vehicle control from among the connected vehicle service types may be associated with the actual vehicle operation modes, for example, a driving mode, a remote control mode, a fault diagnosis mode, etc. Therefore, the use authority of the connected vehicle service related to the vehicle control may be allocated only to the driver seat from among a plurality of seats.

In another example, the use authority of the connected vehicle service related to the personalized service may be allocated to different seats according to the service types. In more detail, the use authority of a first personalized service in which private personal information is needed because the user has to log in to their personal account may be allocated to all seats. However, the use authority of a second personalized service related to vehicle contents, for example, an in-vehicle settlement system service, valet mode setting, vehicle location sharing, etc. may be allocated only to the driver seat.

Meanwhile, although the above-mentioned embodiment is included only for illustrative purposes for convenience of description, the scope or spirit of the present invention is not limited thereto, and the use authority of the connected vehicle service related to the vehicle need not always be allocated only to the driver seat, and may also be easily allocated to any of the remaining seats according to user setting or user intention.

Figure 6:
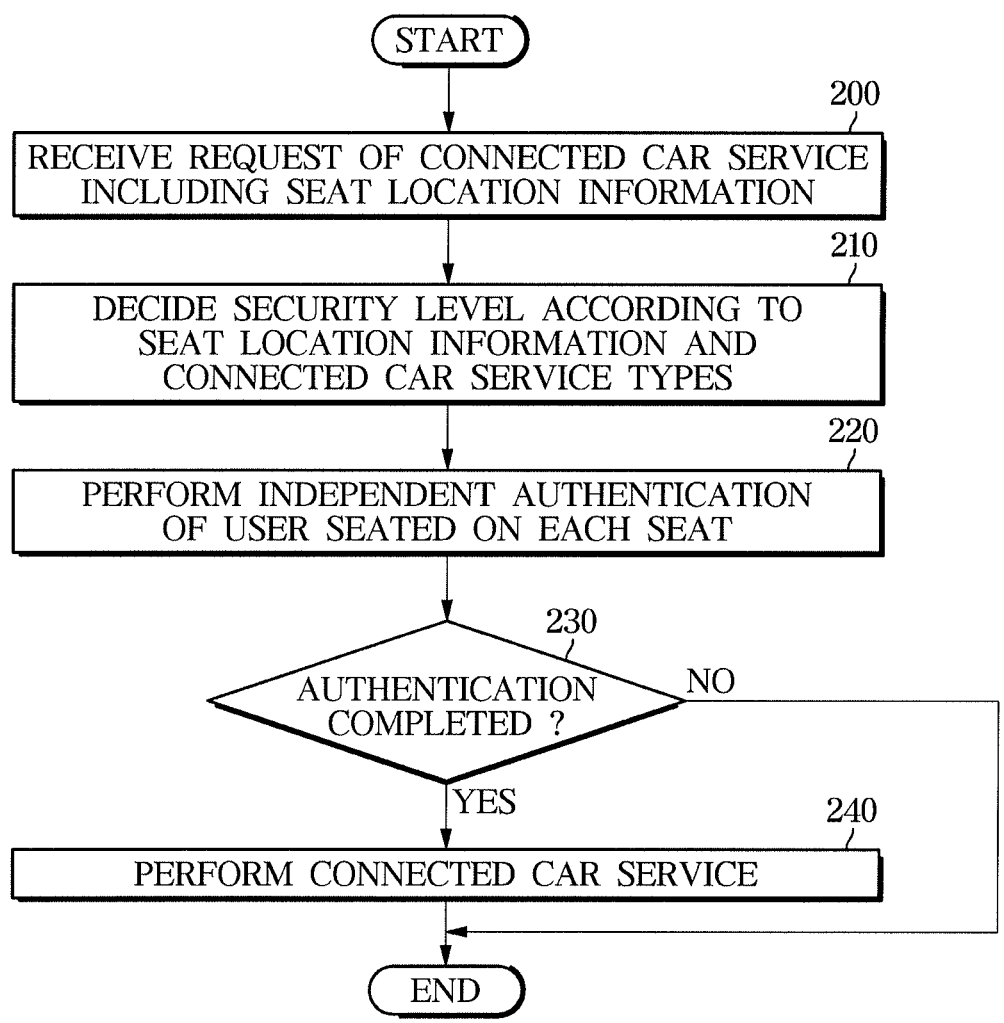
FIG. 6 is a flowchart illustrating a method for controlling the vehicle according to an exemplary embodiment of the present invention.

FIG. 6 is a flowchart illustrating a method for controlling the vehicle according to an exemplary embodiment of the present invention.

Referring to FIG. 6, the vehicle 100 may receive a connected vehicle service request provided with seat number information (200).

Different from the conventional connected vehicle service, the vehicle 100 according to the exemplary embodiment may determine whether the seat was occupied by a user using the sensor module 130 provided in each of the seats.

The vehicle 100 may determine a proper security level from among several security levels according to the seat number information and the connected vehicle service types (210).

For example, the vehicle 100 may receive the connected vehicle service contained in the first personalized service at the position of the driver seat 101. The vehicle 100 may allocate a specific security level "Medium" to the authority method of the first personalized service, as denoted by information pre-established in the storage 180. In another example, under the condition that a user is accommodated on the driver seat 101 and the other user is accommodated on any of the back seats 103, the vehicle 100 may also receive the connected vehicle service of the first personalized service at the position of the driver seat 101. In the instant case, the vehicle 100 may change a security level from "Medium" to "High" for privacy protection of the user who is accommodated on the driver seat 101.

That is, the vehicle 100 may independently allocate a security level to each of a plurality of seats occupied by a plurality of users, and may perform independent authentication per seat, resulting in increased user convenience and security enhancement.

If security levels of the respective seats are decided, the vehicle 100 may independently authenticate each of the users accommodated on different seats (220).

In the conventional connected vehicle service and authentication method, after the connected vehicle service is authenticated only once by a single system mounted to the driver seat, not only the driver but also all other passengers of the vehicle 100 are able to use only the same connected service without distinction therebetween. In contrast, the vehicle 100 according to an exemplary embodiment of the present invention may identify each of the seats, and may independently authenticate the connected vehicle service requested by the user accommodated on the identified seat. As a result, although a plurality of users accommodated on different seats selects the same connected vehicle service, the same connected vehicle service selected by the users may be authenticated in different ways according to the respective seats.

The vehicle 100 may determine whether the authentication method corresponding to the decided security level has been completed (230).

If authentication is completed (230), the vehicle 100 may perform the selected connected vehicle service (240). In contrast, if authentication is not completed (230), the vehicle 100 may not activate the selected connected vehicle service.

Figure 7:
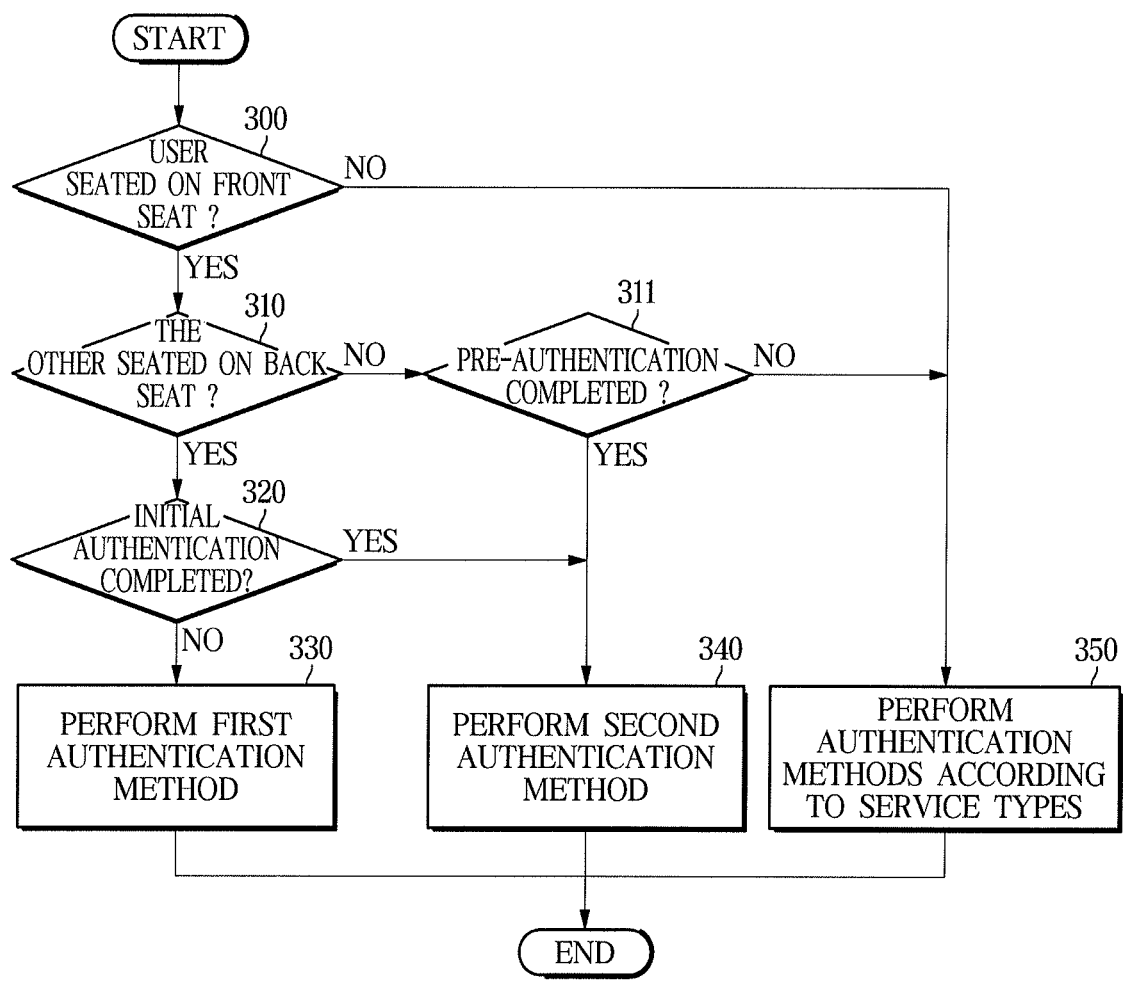
FIG. 7 is a flowchart illustrating an authentication method for a user accommodated on a back seat according to an exemplary embodiment of the present invention.

FIG. 7 is a flowchart illustrating an authentication method for a user accommodated on a back seat according to an exemplary embodiment of the present invention.

Referring to FIG. 7, the vehicle 100 may determine whether not only the driver seat 101 but also the front passenger seat 102 has been occupied by different users (300).

If a user is accommodated only on any of the back seats 103 other than the front seats including the driver seat 101 and the passenger seat 102, the vehicle 100 may perform the authentication method based on a security level decided by the connected vehicle service type selected in the back seat 103 (350).

In contrast, if the user is accommodated on any one of the front seats 101 and 102 (300), the vehicle 100 may determine whether the other user is accommodated on the back seat 103 (310).

If the driver is accommodated on the driver seat 101 and no passengers are accommodated on the passenger seat 102 and the back seat 103, the vehicle 100 may determine whether pre-authentication has been completed (311).

Here, the term "pre-authentication" may refer to an exemplary case in which the driver of the vehicle 100 has already performed authentication before the entire system of the vehicle 100 is turned on or the engine ignition of the vehicle 100 is turned on.

If the user is accommodated on any of the front seats 101 and 102 and no passenger is accommodated on the back seat 103, the user accommodated on the front seat may be considered the driver and the user-accommodated front seat may be the driver seat 101. Therefore, the vehicle 100 may confirm whether pre-authentication has been completed using the telematics server. A detailed description of the pre-authentication process will hereinafter be described with reference to FIG. 11.

If pre-authentication has been completed, the vehicle 100 may perform a second authentication method (340). In contrast, if pre-authentication has not been completed, the vehicle 100 may perform the authentication method based on the connected vehicle service type selected by the user accommodated on the back seat (350).

In the instant case, the second authentication method may refer to an authentication method having a low security level less than those of the connected vehicle service types classified as shown in the table of FIG. 4. The pre-authenticated user may refer to a person who has already been authenticated, such that the pre-authenticated user need not perform the authentication methods having security levels corresponding to the connected vehicle service types shown in FIG. 4. Therefore, the vehicle 100 may perform the second authentication method having a low security level less than that of a preset authentication method (hereinafter referred to as a first authentication method) pre-established for user convenience.

Meanwhile, if a first user is accommodated on any of the front seats 101 and 102 and at the same time a second user is accommodated on the back seat 103, the vehicle 100 may determine whether initial authentication of the first user has been completed (320).

In the instant case, the term "initial authentication" may refer to an exemplary case in which the first user accommodated on the front seat has already been authenticated at least once. In more detail, the initial authentication may indicate that the first user is a pre-authenticated user.

After completion of initial authentication, the vehicle 100 may perform the second authentication method having a relatively low security level, which is configured for being easily authenticated (340). In contrast, if initial authentication is not completed, the vehicle 100 may perform the first authentication method having a relatively high security level (330).

Meanwhile, when the vehicle 100 determines that initial authentication has not been completed, the vehicle 100 may perform either the first authentication method or exceptional security authentication which is configured for preventing private personal information related to the pre-authenticated user from being exposed to another user accommodated on the back seat 103. In the instant case, the exceptional security authentication may refer to an authentication method that has to confirm the personal account, such as biometric authentication or OTP authentication, of the user, such that the private personal information related to the confirmed user may be prevented from being exposed to another user accommodated on the back seat 103. That is, when initial authentication is not completed, the vehicle 100 does not always perform only the authentication methods based on the connected vehicle service types, and may also perform a high-security-level authentication method according to whether another passenger is accommodated on the back seat 103.

As a result, the user accommodated on the back seat 103 is able to easily view private personal information related to the front-seat user. Accordingly, when multiple users are simultaneously accommodated on the front and back seats, the vehicle 100 may adjust security levels of the respective seats such that unique private personal information related to each of the users accommodated on different seats is prevented from being easily exposed to the remaining users.

Figure 8:
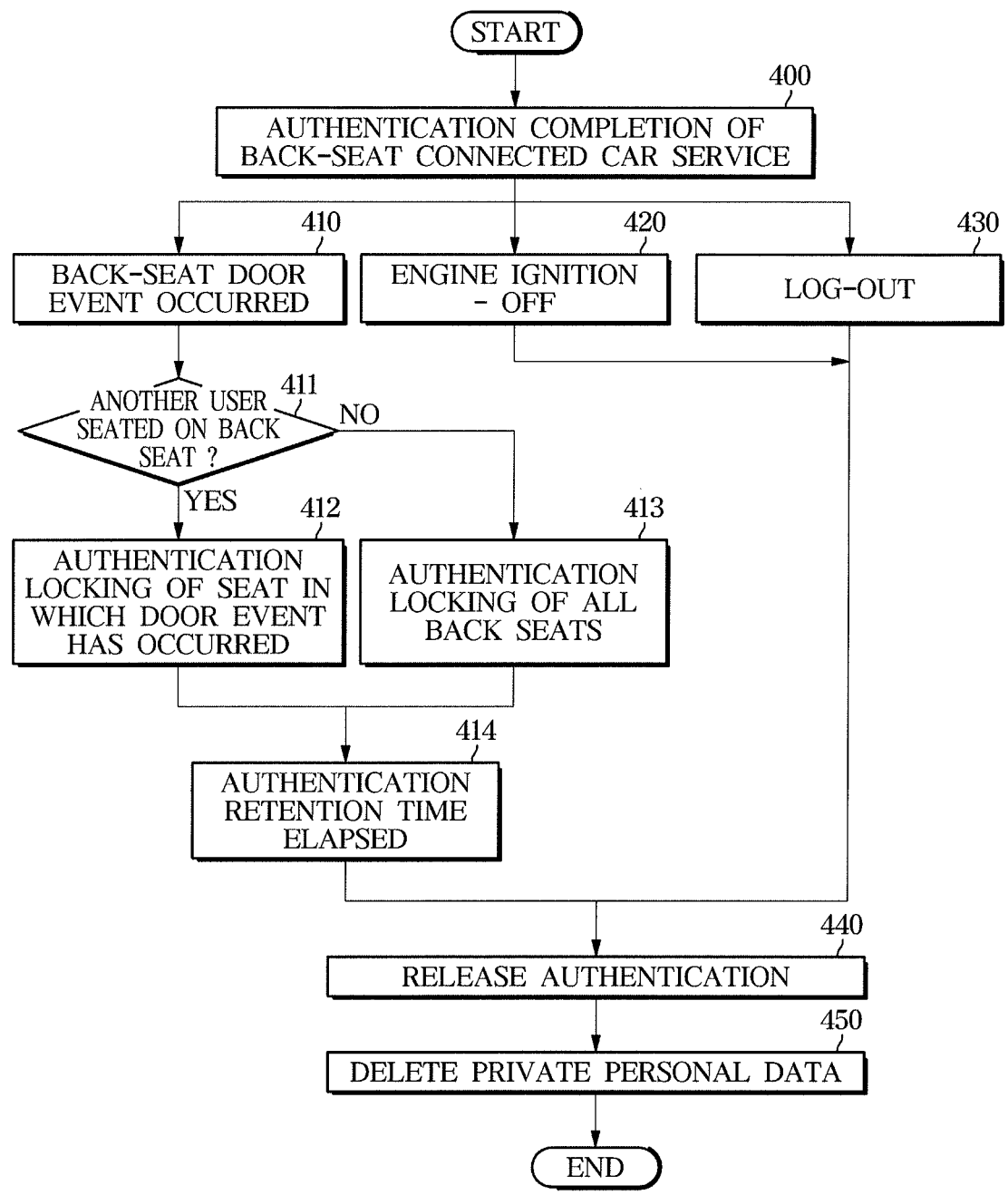
FIG. 8 is a flowchart illustrating a method for releasing user authentication after authentication of a user accommodated on a back seat is completed.

FIG. 8 is a flowchart illustrating a method for releasing user authentication after authentication of the user accommodated on the back seat is completed.

Referring to FIG. 8, there is a high possibility that a user who is accommodated on the back seat 103 is not identical to an owner of the vehicle 100.

Therefore, although the personal account logged in, at the position of the back seat 103, to the authentication server is not explicitly logged out, interaction of the account may be easily released.

Referring to FIG. 8, the connected vehicle service is first authenticated in the back seat 103 (400).

After authentication completion, the connected vehicle service selected in the back seat 103 may start activation.

As a representative example of the situation in which such authentication may be released during activation of the connected vehicle service, the user accommodated on the back seat 103 may input or touch a log-out command. However, even when a door event occurs in the back seat 103 or the vehicle 100 is turned off, the account of the connected vehicle service being currently executed in the back seat 103 may be easily released.

In more detail, the vehicle 100 may determine whether the door event has occurred in the back seat 103 (410).

In the instant case, the door event may refer to the exemplary case in which door locking of the vehicle 100 is released and the user then opens any of the doors.

If the door event has occurred, the vehicle 100 may determine whether another user has been accommodated on the back seat 103 (411).

Although the door event has occurred, the present door event may not always indicate an exemplary case in which a user who has already been accommodated before gets out of the vehicle 100. Therefore, the vehicle 100 may determine whether a passenger user has been accommodated on the other back seat 103, and may then proceed to subsequent processing according to the determined result.

If the user has been accommodated on the other back seat 103, the vehicle 100 may perform locking of authentication of only the back seat 103 located nearest to the opened door (412).

However, if users are not detected in the back seats 103, This means that the users have already gotten out of the vehicle 100, such that the vehicle 100 may perform authentication locking of all of the back seats 103 (413).

After completion of such authentication locking, the vehicle 100 may determine whether a predetermined authentication retention time period has elapsed (414).

Although the door event has occurred in the back seat 103, the vehicle 100 may not immediately release authentication and may maintain such authentication for a predetermined time period. The authentication retention time may be pre-determined or may also be changeable by the user.

After lapse of the predetermined authentication time period, the vehicle 100 may release authentication (440), and may delete private personal data contained in the connected vehicle service and authentication method (450).

Referring back to operation 410 of FIG. 8, during activation of the connected vehicle service in the back seat 103, the driver may stop operation of the vehicle 100 (420).

In accordance with one example, to guarantee the driver's authority to control the vehicle 100, when the engine ignition of the vehicle 100 is turned off, the vehicle 100 may release authentication of the currently connected vehicle service being executed in the back seat 103 (440), and may delete private personal data (450).

Furthermore, the vehicle 100 may also receive an input command for logging out from the connected vehicle service having been authenticated in the back seat 103 (430).

The log-out command may relate to explicit authentication release, such that the vehicle 100 may release authentication (440) and then delete private personal data (450).

Meanwhile, although the control method of FIG. 8 is included only for illustrative purposes, the scope or spirit of the present invention is not limited thereto, and the control method of FIG. 8 may be modified in various ways as necessary. For example, although the vehicle 100 stops operation, the driver may not always perform authentication release for passengers accommodated on the back seats as necessary.

Figure 9:
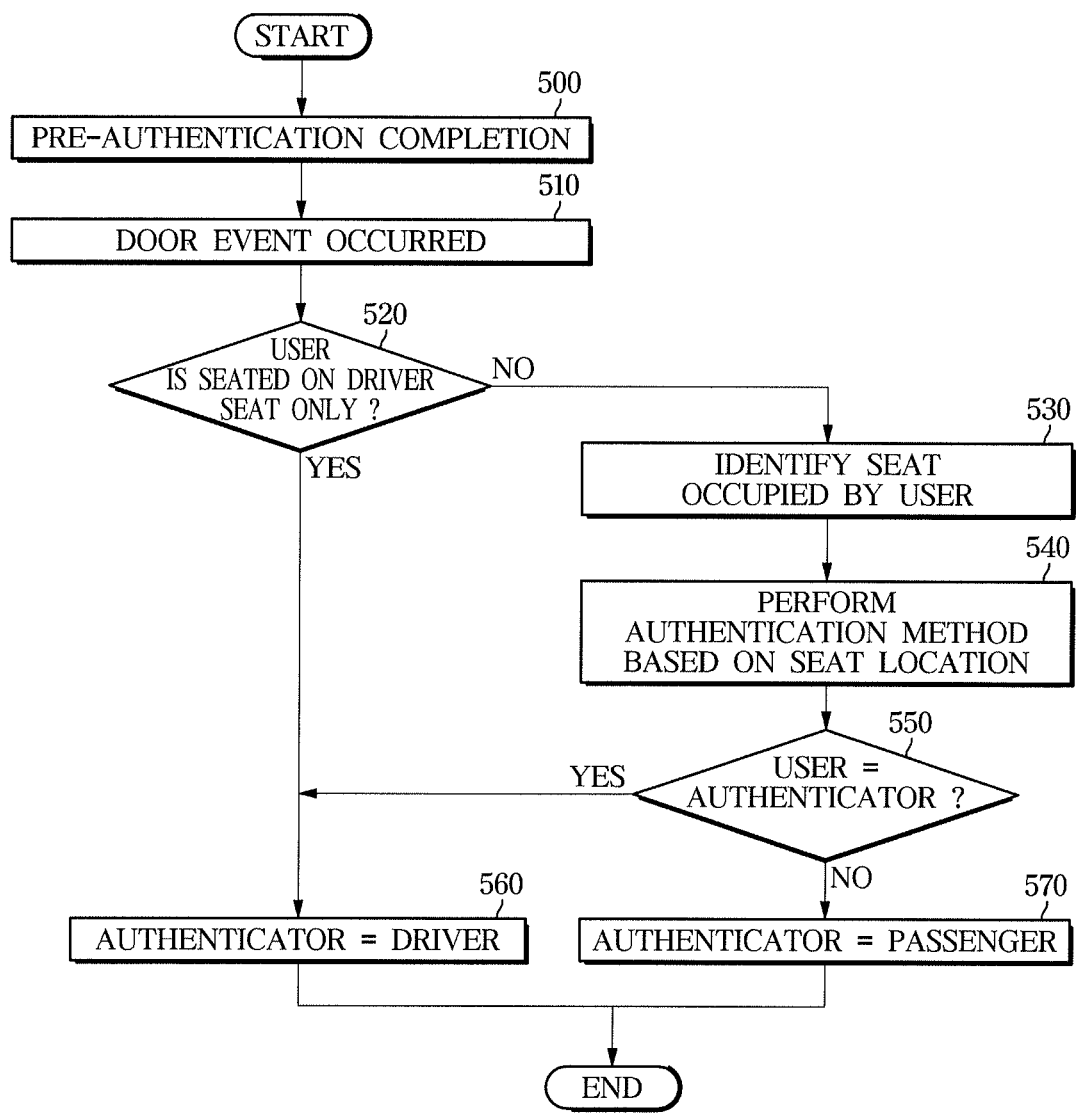
FIG. 9 is a flowchart illustrating a method for identifying a pre-authenticated user according to an exemplary embodiment of the present invention.

FIG. 9 is a flowchart illustrating a method for identifying the pre-authenticated user according to an exemplary embodiment of the present invention.

Referring to FIG. 8, after completion of pre-authentication, several users may simultaneously enter the vehicle 100.

As previously stated in FIG. 7, the pre-authentication process may refer to an exemplary case in which the user who holds the UE 10 has already performed the authentication method through the telematics server.

If the door event has occurred by the user (510), the vehicle 100 may identify which seat was occupied by the user.

The vehicle 100 may determine whether only the driver seat 101 was occupied by the user (520).

If only the driver seat 101 is occupied by the user (i.e., the user is accommodated only on the driver seat 101), the vehicle 100 may determine that the pre-authenticated user (hereinafter referred to as an authenticator) is the driver (560).

However, if not only the driver seat but also other seats have been occupied by users, the vehicle 100 may identify which seat was occupied by each user (530).

For example, the door event may occur in the vehicle 100 provided with several back seats 103, and several users may be accommodated on the respective seats at random. Furthermore, if several door events have occurred, it is impossible for the vehicle 100 to immediately recognize the presence or absence of any user accommodated on the seat. Therefore, if the door events have occurred in any of the remaining doors other than the driver seat 101, the vehicle 100 may identify who the authenticator is according to which seat was occupied by the user acting as the authenticator.

The vehicle 100 may perform the authentication method in different ways according to the respective seats occupied by users (540).

For example, if the user is accommodated on the back seat 103, the vehicle 100 may determine the presence or absence of another user accommodated on any of the front seats 101 and 102 on the basis of the position of the back seat 103, may determine a security level of each of the respective connected vehicle service types executable in the back seat 103, and may perform the authentication method based on the determined security level.

In accordance with the above authentication method, the vehicle 100 may identify a user who performs such authentication. That is, the vehicle 100 may compare user personal information related to the user who currently performs authentication in the back seat 103 with pre-authenticated information (550).

If the user who currently performs authentication in the back seat 103 is identical to the pre-authenticated user (hereinafter referred to as an authenticator), the vehicle 100 may determine that the present authenticator user is identical to the owner of the vehicle 100 (560).

Therefore, the vehicle 100 may allow the user who is currently accommodated on the back seat 103 to freely use not only the connected vehicle services originally executable in the back seat 103, but also the other connected vehicle services executable even in the driver seat 101.

In contrast, if the user who currently performs authentication in the back seat 103 is not identical to the authenticator, the vehicle 100 may determine that the present authenticator user is a passenger (570).

In the instant case, the vehicle 100 may allow only the restricted connected vehicle service to be executable in the back seat 103.

As a result, even when the owner of the vehicle 100 is accommodated on the back seat 103, the vehicle 100 may allocate the control authority configured for executing the connected vehicle service related to vehicle control to the owner located at the back seat 103, resulting in increased user convenience.

Figure 10:
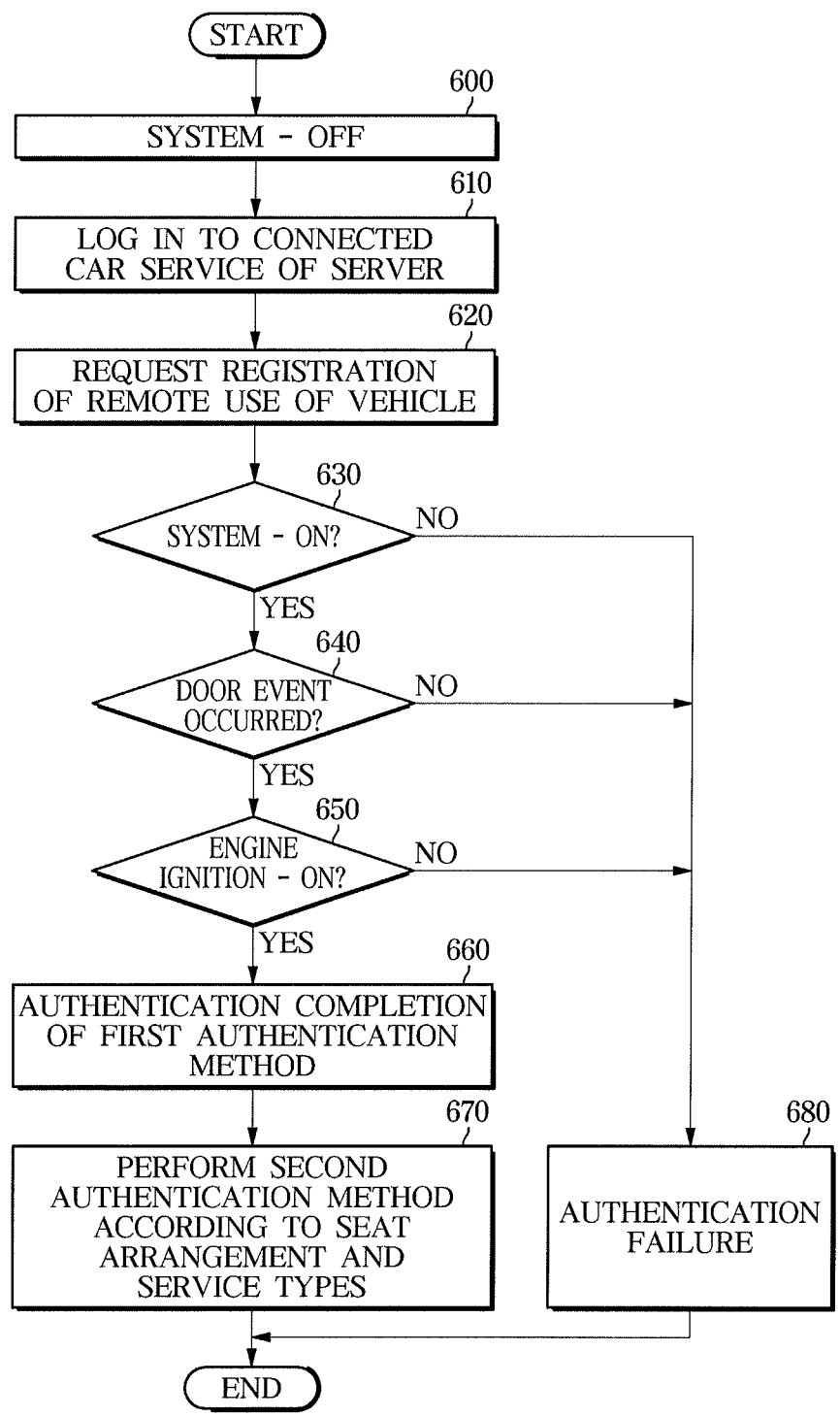
FIG. 10 is a flowchart illustrating a method for performing pre-authentication before a user gets in the vehicle according to an exemplary embodiment of the present invention.

FIG. 10 is a flowchart illustrating a method for performing pre-authentication before a user gets in the vehicle according to an exemplary embodiment of the present invention.

The method of FIG. 9 illustrates various operations to be performed in an exemplary situation in which several users have been pre-authenticated. FIG. 10 illustrates not only a series of processes needed when the authenticator performs pre-authentication, but also associated operations of the vehicle 100.

Referring to FIG. 10, the vehicle 100 stops engine ignition and the entire system of the vehicle 100 is in an OFF mode (600).

The user who is located outside the vehicle 100 may log in to the connected vehicle service of the authentication server 70 using the UE 10 or the like (610).

Furthermore, the user may transmit a request of remote control registration of the vehicle to the authentication server 70 (620).

The authentication server 70 may periodically transmit account information related to the log-in connected vehicle service to the vehicle 100.

After lapse of a predetermined time period, if the vehicle 100 continuously stays in the system OFF mode, this means that authentication failure has occurred, such that the vehicle 100 may transmit a message indicating such authentication failure to the authentication server 70 (680).

If the vehicle 100 transits from the system OFF mode to the system ON mode (630), the vehicle 100 may monitor whether the door event occurs (640).

If the door event has occurred, the vehicle 100 may stay in a standby mode until the engine ignition of the vehicle 100 is turned on (650).

Although the vehicle system is turned on, if the door event does not occur and the engine ignition of the vehicle 100 is not turned on during a predetermined time period, the vehicle 100 may transmit an authentication failure message to the authentication server 70 (680).

However, if the door event is performed and the engine ignition of the vehicle 100 is turned on during the predetermined time period, the vehicle 100 may determine that the first authentication method has been completely authenticated (660).

In the instant case, authentication completion of the first authentication method may be conducted when the user logs in to the authentication server through the UE 10 or the like, prior to starting of the vehicle 100. Therefore, after the system of the vehicle 100 is turned on, the vehicle 100 receives information related to authentication completion from the authentication server 70. If the door event occurs and the engine ignition of the vehicle 100 is turned on, the vehicle 100 may determine that the requested connected vehicle service has been completely authenticated.

Thereafter, if a re-use request from the user has occurred, the vehicle 100 may perform second authentication according to the respective seat number and service types (670).

As a result, the vehicle 100 according to an exemplary embodiment of the present invention may remotely perform authentication before the user enters the vehicle 100. Even when such authentication needs to be performed again, the vehicle 100 may perform the second authentication method having a lower security level, instead of performing the first authentication method, resulting in increased user convenience.

Figure 11:
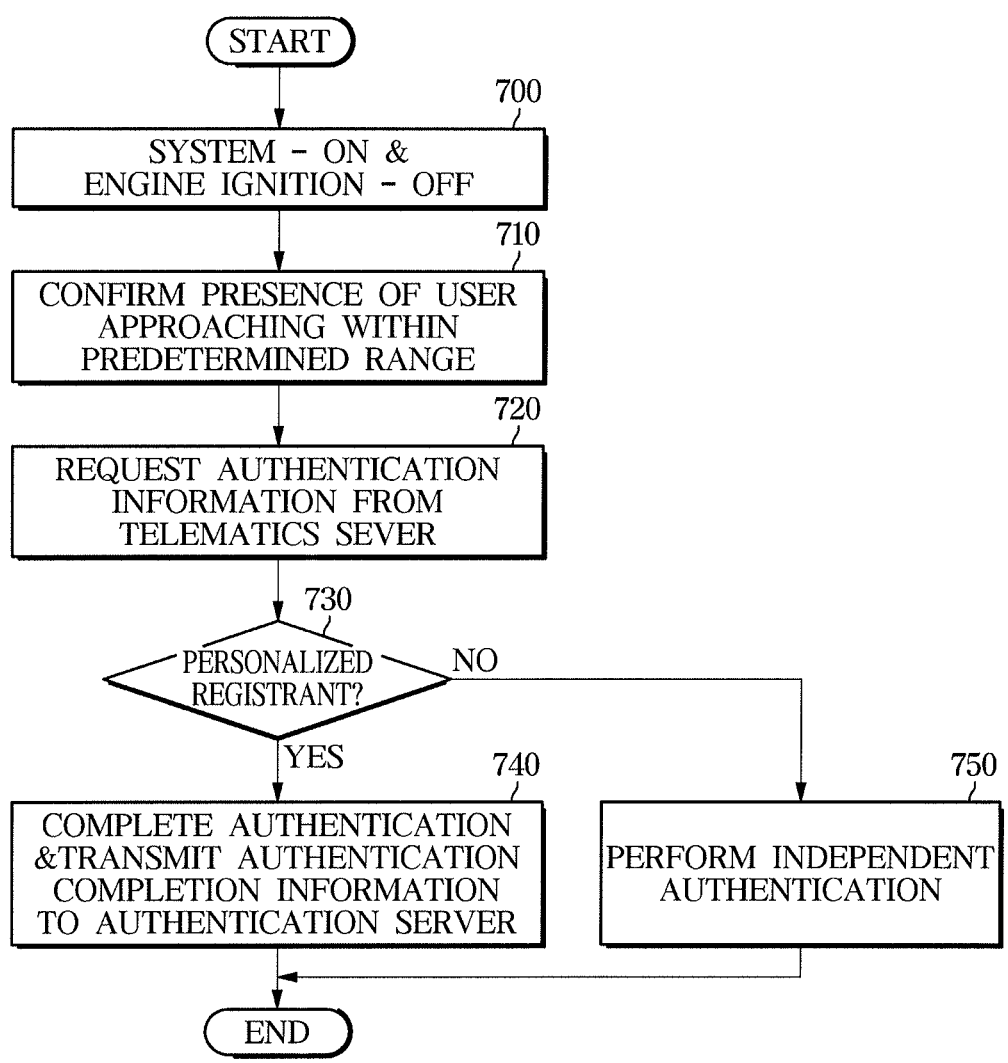
FIG. 11 is a flowchart illustrating a method for authenticating a user who is approaching the vehicle according to an exemplary embodiment of the present invention.

FIG. 11 is a flowchart illustrating a method for authenticating a user who is approaching the vehicle according to an exemplary embodiment of the present invention.

Referring to FIG. 11, before the user enters the vehicle 100, although the user is located outside the range of a predetermined distance from the vehicle 100, the user can turn on the entire system of the vehicle 100 and can also turn off the engine ignition of the vehicle 100 (700).

Although the following embodiment will include that a remote controller can turn on the vehicle system only and cannot turn off the engine ignition of the vehicle system for convenience of description, the scope or spirit of the present invention is not limited thereto. That is, according to another exemplary embodiment of the present invention, the user may also turn the vehicle system on or off using the remote controller.

If the vehicle system is turned on, the vehicle 100 may monitor whether the user approaches within the predetermined distance from the vehicle (710).

In the instant case, various methods for determining the predetermined distance may be used as necessary. The sensor module 130 may determine the position of the user through a laser or like, and/or the communication module 110 may determine the position of the user by communicating with the remote controller and the UE 10.

If the user is approaching the vehicle 100, the vehicle 100 may request authentication information from the telematics server (720).

Differently from the method of FIG. 10, the user of FIG. 11 has not yet been pre-authenticated by the authentication server 70, such that the vehicle 100 may first transmit an authentication completion confirmation request to the telematics server such that the telematics server can determine whether authentication is completed in a response to the received request.

The vehicle 100 may confirm whether the user is a personalized registrant upon receiving the resultant information from the telematics server (730).

In the instant case, the personalized registrant may refer to a kind of telematics services. For example, the personalized registrant may be a user who has already performed authentication processing related to the vehicle 100. That is, the telematics server may act as a proxy for authentication between the personalized registrant and the authentication server 70.

If the user is the personalized registrant, the vehicle 100 may determine that authentication of the user has been completed, and may transmit a signal indicating authentication completion to the authentication server (740).

If the user is not identical to the personalized registrant, the vehicle 100 may perform the above-mentioned independent authentication as shown in FIG. 4 or the like (750).

FIG. 12 is a flowchart illustrating an authentication method when a door event occurs after authentication of a driver seat is completed.

Referring to FIG. 12, the driver is currently accommodated on the driver seat 101 of the vehicle 100 and the vehicle system is then turned on (800).

If the door event has occurred in any of the remaining seats other than the driver seat 101 (810), the vehicle 100 may perform an authentication method (i.e., the first authentication method) having a higher security level than an authentication method corresponding to the selected connected vehicle service (820).

As a result, the vehicle 100 according to an exemplary embodiment of the present invention can prevent private personal information related to the user accommodated on the driver seat from being exposed to the other user accommodated on the back seat.

When the door event does not occur and at the same time the driver requests the connected vehicle service, the vehicle 100 may perform authentication using the authentication method based on the service type and the driver-seat security level (840).

Although the first authentication method has failed to authenticate the driver, the vehicle 100 may recognize the position of a seat occupied by another user after occurrence of the door event and the connected vehicle service type activated by the accommodated user, may select a security level appropriate for the recognized seat number and connected vehicle service types, and may perform an authentication method having the selected security level (840).

Furthermore, if another user accommodated on any of the remaining seats other than the driver seat requests the connected vehicle service, the vehicle 100 may independently perform authentication for the requested connected vehicle service of the accommodated user.

Meanwhile, the exemplary embodiments of FIG. 6, FIG. 7, FIG. 8, FIG. 9, FIG. 10, and FIG. 11 are merely examples for easily explaining various situations generable in the vehicle, and may also be implemented as a series of successive processes shown in the above drawings as necessary.

As is apparent from the above description, the vehicle and the method for controlling the same according to the exemplary embodiments of the present invention may provide an authentication service per seat to passengers accommodated on different seats, adjusting an authentication level appropriate for the use environment of a vehicle infotainment system.

The vehicle and the method for controlling the same according to the exemplary embodiments of the present invention may increase user convenience with a proper security level for user authentication.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle comprising:
    a plurality of seats including at least one front seat provided with a driver seat and at least one back seat located behind the at least one front seat;
    an authentication module configured to perform authentication of at least one user, the at least one user including a first user and a second user; and
    a controller configured to determine a security level based on a type of a vehicle service selected by the at least one user, whether the first user is seated in the at least one front seat and whether the second user is seated in the at least one back seat, control the authentication module to perform the authentication of the at least one user in an authentication method corresponding to the security level and provide the vehicle service based on completion of the authentication,
    wherein the controller is further configured to identify whether to perform pre-authentication of the first user based on a result of determining whether the second user is seated in the at least one back seat, the pre-authentication being performed before the vehicle is turned on, determine the authentication method as a first authentication method based on a first service type selected by the second user seated in the at least one back seat if the pre-authentication of the first user has not been performed, and determine the authentication method as a second authentication method which has a lower security level than the first authentication method if the pre-authentication of the first user has been completed.

2. The vehicle of claim 1, wherein
    after the authentication of the second user in the at least one back seat is completed, the controller is configured to release the authentication of the second user based on at least one of a door event, an engine OFF state of the vehicle, or a log-out event.

3. The vehicle of claim 2, wherein
    when the door event occurs in the at least one back seat, the controller is configured to release the authentication of the second user based on an authentication retention time period.

4. The vehicle of claim 2, wherein
    when the authentication of the second user is released, the controller is configured to delete the vehicle service and private personal data included in the authentication of the second user.

5. The vehicle of claim 1, wherein the controller is configured to receive information related to completion or non-completion of pre-authentication from an external portion of the vehicle, and is configured to determine an authenticator of the pre-authentication to be a driver when a door event of the driver seat occurs.

6. The vehicle of claim 5, wherein
    when the door event of the at least one back seat occurs, the controller is configured to perform the authentication of the second user executable in the at least one back seat, and to determine the authenticator of the pre-authentication to be a passenger when information of the pre-authentication is not identical to information related to the second user whose the authentication performed in the at least one back seat.

7. A method for controlling a vehicle provided with a plurality of seats including at least one front seat provided with a driver seat and at least one back seat located behind the at least one front seat, the method comprising:
    determining, by a controller, a security level based on a type of a vehicle service selected by at least one user including a first user and a second user, whether the first user is seated in the at least one front seat and whether the second user is seated in the at least one back seat;
    performing, by the controller, an authentication of the at least one user in an authentication method corresponding to the security level; and providing, by the controller, the vehicle service based on completion of the authentication,
wherein the performing the authentication includes:
identifying whether to perform pre-authentication of the first user based on a result of determining whether the second user is seated in the at least one back seat, the pre-authentication being performed before the vehicle is turned on,
determining the authentication method as a first authentication method based on a first service type selected by the second user seated in the at least one back seat if the pre-authentication of the first user has not been performed, and
determining the authentication method as a second authentication method which has a lower security level than the first authentication method if the pre-authentication of the first user has been completed.

8. The method of claim 7, further including:
after the authentication of the second user is completed in the at least one back seat, releasing, by the controller, the authentication based on at least one of a door event, an engine OFF state of the vehicle, or a log-out event.

9. The method of claim 8, wherein the releasing the authentication includes:
when the door event occurs in the at least one back seat, releasing the authentication of the vehicle service based on an authentication retention time period.

10. The method of claim 8, further including:
when the authentication of the second user is released, deleting, by the controller, the vehicle service and private personal data included in the authentication of the at least one user.

11. The method of claim 7, further including:
receiving, by the controller, information related to completion or non-completion of pre-authentication from an external portion of the vehicle; and
when a door event of the driver seat occurs, determining, by the controller, an authenticator of the pre-authentication to be a driver.

12. The method of claim 11, wherein the determining an authenticator of the pre-authentication to be a driver, includes:
when the door event of the at least one back seat occurs, performing the authentication of the second user in the at least one back seat, and determining the authenticator of the pre-authentication to be a passenger when information of the pre-authentication is not identical to information related to the second user whose the authentication performed in the at least one back seat.

* * * * *